US010191831B2

(12) United States Patent
Soeder

(10) Patent No.: US 10,191,831 B2
(45) Date of Patent: Jan. 29, 2019

(54) MACRO-SCRIPT EXECUTION CONTROL

(71) Applicant: Cylance Inc., Irvine, CA (US)

(72) Inventor: Derek A. Soeder, Irvine, CA (US)

(73) Assignee: Cylance Inc., Irvine, CA (US)

(*) Notice: Subject to any disclaimer, the term of this patent is extended or adjusted under 35 U.S.C. 154(b) by 0 days.

(21) Appl. No.: 15/614,355

(22) Filed: Jun. 5, 2017

(65) Prior Publication Data

US 2017/0357805 A1 Dec. 14, 2017

Related U.S. Application Data

(60) Provisional application No. 62/347,423, filed on Jun. 8, 2016.

(51) Int. Cl.
G06F 9/46 (2006.01)
G06F 11/34 (2006.01)
G06F 21/54 (2013.01)
G06F 21/56 (2013.01)
G06F 9/448 (2018.01)

(52) U.S. Cl.
CPC ........ *G06F 11/3466* (2013.01); *G06F 9/4484* (2018.02); *G06F 9/468* (2013.01); *G06F 21/54* (2013.01); *G06F 21/566* (2013.01)

(58) Field of Classification Search
CPC .... G06F 9/4484; G06F 9/45512; G06F 9/468; G06F 11/3466; G06F 21/54; G06F 21/566; G06F 21/577; H04L 63/1416; H04L 63/145
USPC ................ 717/124–135; 726/22–25
See application file for complete search history.

(56) References Cited

U.S. PATENT DOCUMENTS

| 2002/0019941 | A1* | 2/2002 | Chan | G06F 21/53 713/185 |
| 2006/0218556 | A1* | 9/2006 | Nemirovsky | G06F 9/3851 718/104 |
| 2006/0282897 | A1* | 12/2006 | Sima | G06F 11/3664 726/25 |
| 2006/0288420 | A1* | 12/2006 | Mantripragada | G06F 21/51 726/25 |
| 2007/0016949 | A1* | 1/2007 | Dunagan | G06F 21/51 726/22 |
| 2007/0113282 | A1 | 5/2007 | Ross | |
| 2008/0244074 | A1* | 10/2008 | Baccas | G06F 21/56 709/227 |
| 2008/0282350 | A1* | 11/2008 | Khilnani | G06F 21/564 726/24 |

(Continued)

FOREIGN PATENT DOCUMENTS

RU 2 584 507 5/2016
WO 2014183545 11/2014

*Primary Examiner* — Qing Chen
(74) *Attorney, Agent, or Firm* — Jones Day

(57) ABSTRACT

An agent inserts one or more hooks into a sub-execution runtime environment that is configured to include a script and/or targeted to include the script. The agent including the one or more hooks monitors a behavior of the sub-execution runtime environment and/or the script. The agent subsequently obtains context information regarding the sub-execution runtime environment and/or the script so that it can control the runtime of at least the sub-execution runtime environment. Related systems, methods, and articles of manufacture are also disclosed.

31 Claims, 4 Drawing Sheets

(56) References Cited

U.S. PATENT DOCUMENTS

| | | | | |
|---|---|---|---|---|
| 2010/0005528 A1* | 1/2010 | Teller | ............... | G06F 21/54 |
| | | | | 726/22 |
| 2011/0258610 A1* | 10/2011 | Aaraj | ............... | G06F 21/554 |
| | | | | 717/128 |
| 2015/0052607 A1* | 2/2015 | Al Hamami | ............ | H04L 67/02 |
| | | | | 726/23 |
| 2016/0180086 A1 | 6/2016 | Ladikov et al. | | |

* cited by examiner

300

310 — INSERTING, BY AN AGENT, ONE OR MORE HOOKS IN A SUB-EXECUTION RUNTIME ENVIRONMENT

320 — MONITORING, BY THE AGENT INCLUDING THE ONE OR MORE HOOKS, ONE OR MORE CERTAIN BEHAVIORS OF THE SUB-EXECUTION RUNTIME ENVIRONMENT FOR A SCRIPT

330 — OBTAINING, BY THE AGENT INCLUDING THE ONE OR MORE HOOKS, CONTEXT INFORMATION REGARDING THE SUB-EXECUTION RUNTIME ENVIRONMENT AND/OR SCRIPT

340 — CONTROLLING, BY THE AGENT, THE RUNTIME BEHAVIOR OF THE SUB-EXECUTION RUNTIME ENVIRONMENT AND/OR SCRIPT BASED ON THE MONITORING AND/OR OBTAINING

FIG. 3

MACRO-SCRIPT EXECUTION CONTROL

RELATED APPLICATION

The current application claims priority to U.S. patent application Ser. No. 62/347,423 filed on Jun. 8, 2016, the contents of which are hereby fully incorporated by reference.

TECHNICAL FIELD

The subject matter described herein relates to techniques for controlling computer environments.

BACKGROUND

Detection of unwanted objects, such as malware, viruses, and other unwanted or entrusted objects, in an execution environment may be performed at a computer as part of endpoint detection of those unwanted objects. For example, an object, such as a file, document, program, and/or the like, may be analyzed as part of execution control to determine whether to allow execution of some portion of the object.

SUMMARY

In some implementations, the current subject matter relates to the detection, interception, and/or control of behaviors associated with scripts.

In one aspect there is provided a method. The method may include inserting, by an agent, one or more hooks into a sub-execution runtime environment, the sub-execution environment configured to include a script and/or targeted to include the script, monitoring, by the agent including the one or more hooks, a behavior of the sub-execution runtime environment and/or the script; obtaining, by the agent including the one or more hooks, context information regarding the sub-execution runtime environment and/or the script; and controlling, by the agent, the runtime of at least the sub-execution runtime environment, the controlling based on the monitored behavior and the obtained context information.

In some implementations, the above-noted aspects may further include additional features described herein including one or more of the following. The one or more hooks may be inserted into a runtime environment for a document, wherein the script may be embedded in the document. The agent may insert a plurality of hooks comprising code hooks into the sub-execution runtime environment for the script and the runtime environment for the document. At least one of the hooks may be placed in a dynamic link library to monitor calls made by the sub-execution runtime environment including the script. The context information may include a file name, a file path, and/or a URL. At least one of the hooks may store the context information using a global variable to enable sharing the context information with the agent or another hook. The controlling may include obtaining, by the agent, policy information, and determining, based on the monitored behavior, the obtained context information, and the obtained policy information, a remedial action to control the runtime of the at least the sub-execution runtime environment including the script. The remedial action may include inhibiting execution of the script and/or allowing the script to execute with limited resources. Moreover, a process may be monitored to determine, based on at least one hook and the context information, whether the monitored behavior is being performed by the process on behalf of the script, and information about the script may be obtained, as well as reporting of the behavior and/or application of a remedial action to the process. The agent may insert at least one of the hooks into the sub-execution environment before the targeted script is loaded, run, and/or selected for loading. The agent may insert at least one of the hooks into the sub-execution environment including the script before the script is allowed to run and/or the script is called. The agent may control by at least preventing the script from being loaded, called, and/or executed.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 depicts an example of a process for script execution control, in accordance with some example embodiments.

DETAILED DESCRIPTION

Figure 1:
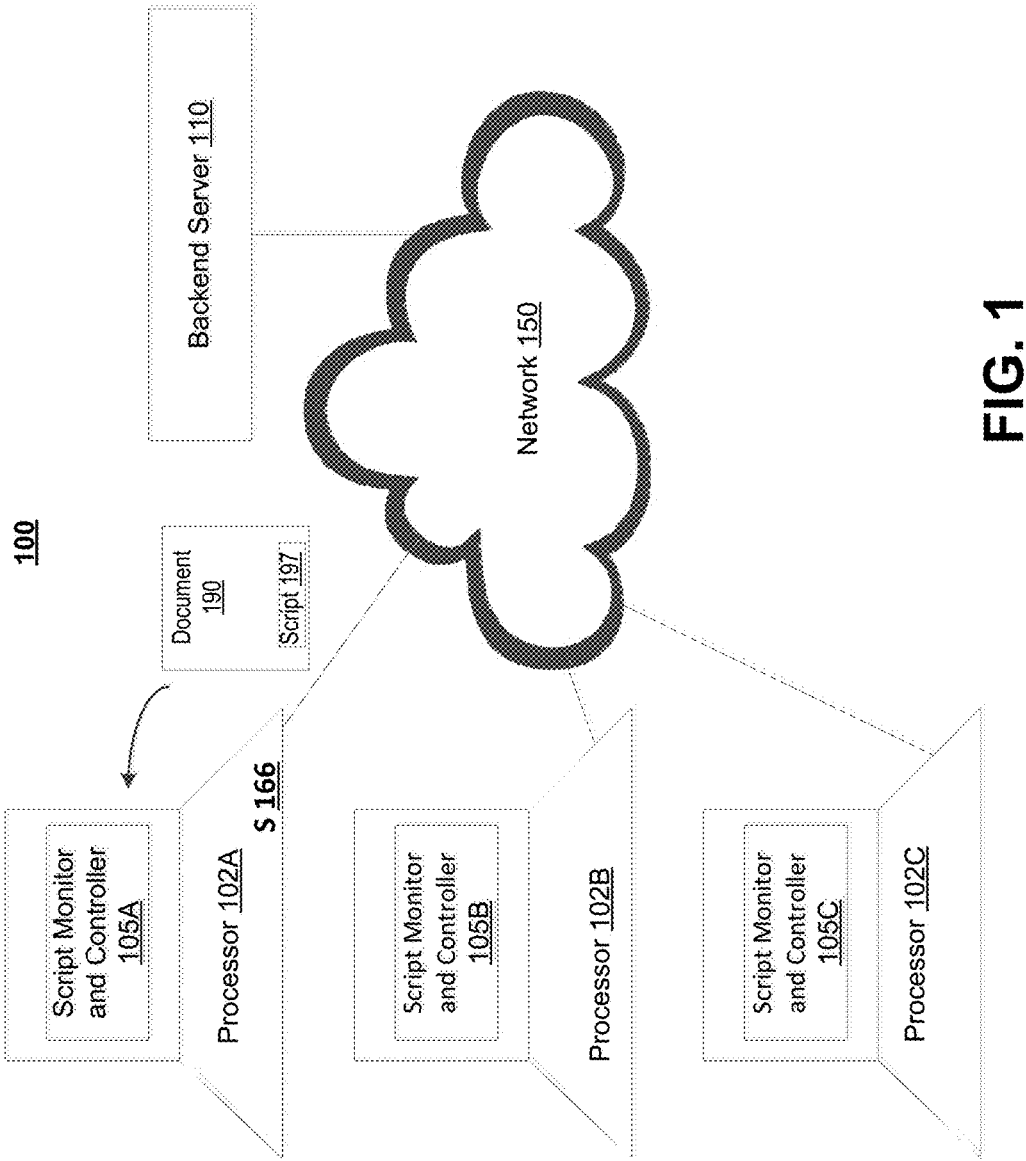
FIG. 1 depicts an example of a system for script execution control, in accordance with some example embodiments.

Documents can be exchanged by computers, smart phones, and/or other processor-based devices. These documents, such as flies and/or the like, may include a script, such as a macro-script. For example, a document, such as a word processing document, a spreadsheet, and/or other file type, may include a script. The script may include instructions (e.g., code, etc.) embedded in the content of the document. In this way, the document handler program (e.g., a word processor, spreadsheet, or handler for another type of file or document) may provide the capability to run code that is embedded in the content of the document.

Scripts are generally intended to manipulate document content or improve the viewing experience associated with the content. To illustrate, an Adobe portable document format (PDF) document may present a page of document content, and this PDF document may include script, such as JavaScript, to enable manipulation of the content being presented. Like PDFs, Microsoft Office documents can include, in addition to content, script in the form of Visual Basic for Applications (VBA, also known as VBE scripts or macro-scripts) to enable manipulation of textual, graphical, and numerical data content in the document. The script is typically implemented to primarily interact with the associated content of the underlying document. For example, a spreadsheet document may include a script, such as VBE, to dynamically re-compute the spreadsheet values or automatically generate a form including a graph or barcode, when new data inputs are received.

Although scripts can be useful from a user perspective, scripts can represent a security threat. Specifically, a script can be inserted into a document to perform unauthorized, such as malicious or unintended, operations at a host computer or other type of processor, exceeding thus the access limitations that the user expects or assumes for that script. For example, a spreadsheet including a VBA script can, as noted, be used to dynamically re-compute the spreadsheet values and present the results on a display, which would typically be an authorized operation for that script. However, the VBA script may be used maliciously to, without authorization and/or knowledge of the host's user, download and execute malware from the Internet. Thus, what makes scripts so useful also presents a vulnerability to a host executing that script.

Unfortunately, scripts have become an increasingly common way for cyber-criminals to compromise host computers of individuals and/or organizations. For example, a cyber-criminal may target a specific individual by sending to the individual an email including an attachment, such as a Word, Excel, and/or any other type of document or file type. The attached file in this example includes malicious script. When the file including the script is opened, the script may automatically execute (for example, run) and perform, at the individual's host computer, unauthorized operations, such as downloading and/or executing malicious code from the Internet. In some cases, the script may be prevented from executing by a security setting in for example the document handler program. To fool a user to disable a security setting, the document may present a user interface view that prompts or encourages the individual to disable a security setting or dismiss a security warning, unwittingly enabling the script to compromise the host computer. Thus, there is a technical problem regarding which scripts should or should not be allowed to run.

FIG. 1 depicts an example system 100 including one or more processors 102A-C, such as a computer, a tablet, a mobile device, a smart phone, and/or any other device including at least one processor and at least one memory including program code.

In the example of FIG. 1, each of the processors 102A-C includes a script monitor and controller (SMC) 105A-C, in accordance with some example embodiments. The SMC 105A-C may be configured to use an agent to insert hooks into one or more portions of the execution environment of the document being executed at the host computer. The SMC including the inserted hooks can provide multiple opportunities to detect the loading of the script, obtain context information for the script, and/or determine what behavior the script is trying to perform.

In some example embodiments, the processors 102A-C including the SMC 105A-C; may be coupled via at least one network 150 (e.g., the Internet, a public land mobile network, a wireless local area network, a point-to-point link, and/or any other wired or wireless communication medium).

In the example of FIG. 1, processor 102A receives a document 190 including script 197. For example, processor 102A may receive an email including document 190 and script 197 (although the document 190 and script may be received in other ways), SMC 105A may detect the arrival of the document 190, monitor the execution of document 190, and insert hooks into the runtime process of document 190 including script 197 to detect the loading of the script, obtain context information for the script, and/or determine whether the script is performing behavior that might be malicious or otherwise harmful.

System 100 may also include a backend server 110. The backend server 110 may couple to the network 150 to enable downloading the SMC 105A-C to the corresponding processor 102A-C. Moreover, the backend server 110 may provide updates to the SMCs. These updates may include updates to the SMC code itself as well as updates to any metadata (for example, whitelists, local models, and the like as described further below). Although the backend server 110 is shown as remote from the SMC 105A and processor 102A, the backend server's functionality may, alternatively or additionally, be provided as a service 166 at processor 102A where SMC 105A is located. For example, SMC 105A (and/or an agent therein) may check policy stored locally and accessed locally via the service 166 at processor 102A, although the backend server 110 in this scenario may still provide policy updates and/or collect information and reports from the SMC 105A.

The backend server 110 may also include policy. The policy may define, for one or snore different types of scripts or behaviors (for example, actions or operations), the type of remedial action to perform. For example, a policy may detect a certain type or category of script, and the policy may dictate whether the SMC should inhibit (for example, kill or stop) execution of the script, allow execution of the script, watch or monitor the script to detect any other indications of malicious activity, and/or allow the script to execute with limited resources at the host (for example, in a so-called sandbox, virtual machine, and/or the like where execution of the script can be restricted).

The server 110 may also include a so-called "white list" indicating types or categories of scripts that can be allowed to execute and/or a so-called "black list" indicating types of categories of scripts that should not be allowed to execute.

Figure 2:
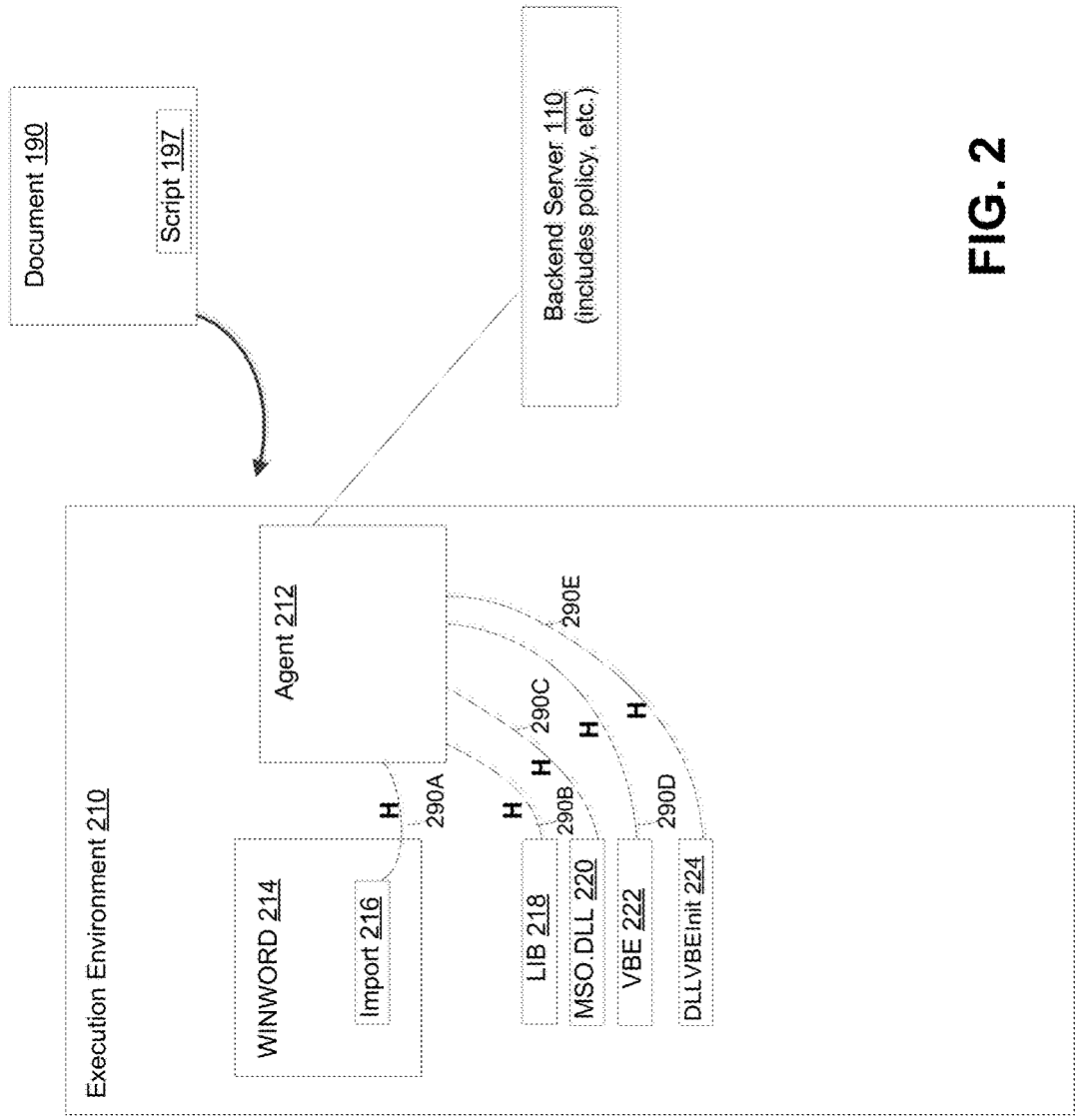
FIG. 2 depicts the hooks that may be used to monitor and control the script, in accordance with some example embodiments.

FIG. 2 provides a pictorial representation of a process for script control performed by an SMC, such as SMC 105A, in accordance with some example embodiments.

In the example of FIG. 2, the processor 102A may receive a document 190, such as a Word document, PDF document, and/or other type of document or file. This document 190 may include a script 197, such as VBE, embedded in the document 190. As such, when the document 190 is executed, a runtime process or environment is created. In the case of a Word document, a WINWORD 214 runtime process is started. When the script 197 is called for execution from within WINWORD 214, the WINWORD 214 runtime process may create a secondary or sub-execution for the script 197. In the example of FIG. 2, a VBE sub-execution runtime may be called to provide a runtime environment for the script 197.

An execution environment may include a physical and/or logical allocation of hardware and other platform resources, and may provide or facilitate the execution of instructions. The execution environment may be virtual (in which case it may be referred to as a virtual machine). Moreover, the execution environment may provide an abstraction of platform specifics and isolation from other execution environments that may be present. In the case of a so-called "sub-execution environment," it is an execution environment implemented within the context of another execution environment.

Although some of the examples refer to certain types of documents such as Word and certain types of scripts such as VBE, the subject matter disclosed herein for monitoring and controlling script execution may be used with other types of documents, files, and/or script/macroscript types.

The SMC 105A may monitor the arrival of the document 190 at processor 102A, and insert an agent 212 into the runtime execution environment 210 of the document 190. For example, when the document 190 is selected or opened for execution, the SMC 105A may detect the execution of document 190. An injector, such as a kernel driver, a service, or an operating system-provided service or mechanism, may inject agent 212 into the runtime process hosting the execution of the document 190 and the script 197.

To illustrate further, dynamic link library (DLL) injection may be used to run code within the address space of the process that handles the document 190 including script 197 by forcing it to load a DLL. In this way, the behavior of the document 190 and/or script 197 processes may be modified to monitor and/or prevent malicious script behavior from being allowed to proceed. For example, the injected hook may hook (e.g., monitor, alter, or augment the behavior of software components by intercepting function calls, messages, or events passed between software components) system function calls and/or other functions of the script, application, or operating system environment.

In the example of FIG. 2, the agent 212 may insert one or more so-called "hooks" 290A-E to monitor the execution in order to determine when the script being executed attempts to perform certain operations. The hooks 290A-E may be inserted into various points in the execution process to provide multiple opportunities to detect the loading of the script, obtain context information for the script, and/or determine what behavior the script is trying to perform. For example, a hook may monitor the script execution environment itself such as VBE 222 by hooking the internal bytecode dispatcher of a script interpreter. The hook can also monitor operating system-provided functions or the interface (or linkage) between the script execution environment and the operating system (as well as between other components).

An example of a hook is depicted at Table 1 below.

TABLE 1

```
BOOL DeleteFile_HookProc(LPCWSTR wszFileToDelete)
{
   if (IsScriptExecuting( ))
   {
      Action action = CheckPolicy(
         DeleteFileOperation,
         GetCurrentDocumentPath( ),
         wszFileToDelete);
      switch (action)
      {
      case Allow:
         break;
```

TABLE 1-continued

```
      case Fail:
         SetLastError(ERROR_ACCESS_DENIED);
         return FALSE;
      case Throw:
         RaiseException(E_ACCESSDENIED, 0, 0, 0);
      case Terminate:
         ExitProcess(E_ACCESSDENIED);
      default:
         Log("Error in DeleteFile_HookProc");
         break;
      }
   }
   return g_pfnOriginalDeleteFile(wszFileToDelete);
}
```

The agent 212 may, as noted, install hooks in the operating system functionality, such as in the WINWORD execution environment 214 to detect what type of object is being imported (and/or from where an object is being imported) into the execution environment for the runtime process of the document 190.

The agent 212 may install hooks as events occur. For example, the agent may install hooks in additional operating system and/or script execution environment-related modules as they are loaded into the execution environment including memory. In the example of FIG. 2, the agent 212 may install hooks 290B-C as the library 218 and/or the objects 220 (for example, MSO.DLL) are called or accessed.

The agent 212 may install hooks that obtain contextual information relating to script execution, such as the file path or URL of the document containing the script. For example, hook 290E at DLL 224 may have access to a data structure pointing to a file name, URL, or path of a file being loaded by the VBE 222. In this way, context hook 290E may capture and share this context (for example, file name or path of the object being loaded or imported) with other hooks. In this example, the context information may only be visible locally within the VBE execution environment, so the hook 290E may share that runtime context information with other hooks and/or store the runtime context information globally (by for example storing the context information in a global variable).

At least one of the hooks 290A-E may be configured to detect and intercept certain types of behaviors by the script 197. For example, a hook may be used, during a runtime process, to obtain and/or provide context information to enable determining whether a script is attempting to perform one or more of the following behaviors: when a script attempts to run another program; when a script attempts to delete a file; when a script attempts to create an object such as a program component; and/or when a script attempts to call a system level function or another application programming interface. These script behaviors may be indicative of whether a script is likely to be malicious. In some cases, a more nuanced consideration of the attempted behavior in conjunction with context information may be implemented, such as for the purpose of reducing the incidence of false positives. In some instances for example, it may not be appropriate to apply a single remedial action in response to all attempts by a script to access another file. A script contained in a document residing in a "trusted" folder may be allowed to access other files in that folder and to delete files that it previously created in any folder. On the other hand, a script in a document that resides in a temporary folder may not be allowed to access other files in that folder because temporary files often belong to many different applications and may contain sensitive information. In another example, a script in a document that was downloaded from a company intranet server may be allowed to communicate with that server, while a script in a document that was saved by an email client a not be allowed to communicate with any server, due to the risk presented by email attachments. As another example, a script may be allowed to execute programs generally, yet it may be prohibited from executing new programs it downloads or creates.

In some example embodiments, a hook such as hook 290D may be placed in the script execution environment 222 by directly placing the hook 290D in the bytecode of the script. When this is the case, hook 290D may monitor the behavior of the VBE execution 222, and as it executes may determine when the VBE imports or makes calls to other objects. In the example of FIG. 2, a hook 290E may also be placed in the DLL (e.g., at DllVbeInit) to determine what data structure the VBE 222 accesses to identify during runtime the location, file path, or URL of a document containing a script being executed by the VBE. The hook 290D may then determine that the VBE execution 222 is attempting to perform a certain behavior such as deleting a file (although other types of script behavior may be monitored, detected, and/or controlled by the hooks, agent, and policy). In this example, when hook 290D detects this delete behavior, it may access policy from the server 110 to determine whether the VBE 222 should be allowed to delete the file. When the behavioral hook 290D intercepts the dangerous behavior (such as an attempt to delete a file) attempted on behalf of the script 197, hook 290D may retrieve available context information (which may include the context information obtained from hook 290E and other context information obtained from the operating system, the script execution environment, and/or from storage containing information captured by intermediate hooks). This context information about the behavior may be considered along with the policy to determine a remedial action with respect to the script.

The SMC 105A and/or hook 290D may then perform a remedial action (which may be defined by the policy). For example, the remedial action may terminate the process for the execution environment 210 for WINWORD 214, when the VBE script attempts a dangerous behavior according to policy and context information. Other possible remedial behaviors may include quarantining a file determined to be responsible for causing the behavior. The availability of alternatives is desirable because termination may be unduly disruptive to a user viewing a document, particularly in the event that the detection of dangerous behavior is a false alarm. Alternatively or additionally, the SMC 105A may modify (for example, using a hook) the attempted behavior such that it has a mitigated effect (for example, the process runs with limited access to resources of the host, in a sandbox, and/or the like).

To illustrate further by way of the example of FIG. 2, agent 212 may insert a hook into an operating system function used by WINWORD 214, such as the Windows DLL function, LoadLibrary, tasked to load DLLs (see, e.g., 218 and/or 220). In this example, when the library 218 or DLL 220 tries to load VBE, the hook 290B or 290C intercepts the load of the VBE. In this way, agent 212 and/or SMC 105A are aware of the load of the script execution environment, such as VBE. When the script execution environment such as the VBE 222 loads in the execution environment, the agent 212 may also insert another hook into aspects of the VBE such as the VBE initialization function at 224. When the VBE initialization function 224 function is called by the application hosting VBE, the hook 290E checks that the initialization function has not already been called and that the initialization parameters are as expected. If so, the hook 290E obtains context information from the initialization parameters and places them into a global variable, which can be used when a macro is executing to identify the source of that macro. Another hook 290D may intercept at 222 a VBE "kill" functionality attempting to delete one or more files. If the "kill" function is called by the VBE 222, the hook 290D identifies the calling macro and obtains context information (from for example a global variable, hook 290D, and/or the like), and this context information may identify which file is to be deleted. The agent 212 may then use the available information to evaluate a policy and determine whether a protective action should be taken.

FIG. 3 depicts an example process 300 for controlling the behavior of a script, in accordance with some example embodiments. The description of FIG. 3 also refers to FIG. 2.

At 310, an agent may insert one or more hooks into a sub-execution runtime environment. For example, agent 212 may include hooks 290A-290C that monitor the execution of an application, such as WINWORD 214. In the example of FIG. 2, the hooks 2901A-C may detect WINWORD calls to for example a script sub-execution environment 222 for VBE. This allows the agent to determine the event that triggers the creation of the script execution environment. When the hooks detect this call, the agent 212 may insert hook 290D into the execution of the VBE execution environment and hook 290E into DllVbeInit 224.

At 320, the agent including the hooks may monitor for certain behaviors of the sub-execution runtime environment 222 for the script such as VBE. For example, the hook 290E may monitor for calls to a delete (or kill) file function, a create file function, and/or a modify (or update) file function.

At 330, the agent including the hooks may obtain context information related to certain behaviors of the sub-execution runtime environment 222 for the script such as VBE. For example, a hook, such as hook 290E, monitors calls referencing a data structure pointing to a file, URL, or file path that is the source of the document containing the script. Because this context information may only be available in the local runtime of the VBE 222, it may not be "in scope" for the agent 212, in such a way that the agent 212 can conveniently and reliably obtain a reference to the information, unless hook 290E is inserted into the runtime execution environment. In this example, the information is "in scope" during the execution of hook 290E, and hook 290E copies this reference into a private scope of the agent 212. Hook 290E may send this captured context information to other hooks, such as hook 290D and/or the like, agent 212, and/or store the context information using a global variable available outside the local bytecode execution environment of VBE 222.

At 340, the agent may control the runtime behavior of the sub-execution environment and/or the script in that environment. For example, the agent 212 may obtain (from hook 290E) information regarding an attempted behavior by for example a script, such as script 197. This information may indicate that script 197 is attempting a deletion (or kill) of a file and the context information may indicate the file name, path, or URL of the file. In this example, the policy may indicate to the agent that scripts may not delete files generally or that the script cannot delete the file indicated by the context information. The policy may also indicate the remedy, such as kill or terminate the VBE 222 operation or WINWORD 214 process. Next, the agent 212 kills the VBE 222 operation and/or WINWORD 214 process. The policy may be customized to apply various remedies according to the script type, script operation, script operation arguments (such as a target program to be executed, a target file to be deleted, or a class or object to be obtained, matched by a string literal, a regular expression, or other pattern), document type, document source or origin, active user, host system identifiers, or other criteria observed at or prior to the time at which the intercepted behavior occurs. For example, the policy may be configured to allow a script executing in a WINWORD 214 process to start another WINWORD process, while an attempt to start a CMD or Powershell process results in termination and an attempt to start any other process is blocked without termination. As another example, scripts run by users in an accounting department may be allowed to instantiate a network communication object from Excel, and users in a project management department may be allowed to instantiate a chart object from Visio, while all other object instantiations may be blocked.

The policy may indicate other remedies, such as causing an operation to be ignored while appearing to succeed, redirecting the operation to apply to a sandbox, enabling stricter security measures or auditing, and/or collecting a memory dump of the process for investigative purposes.

The agent including the hook may also monitor the behavior of a process to determine whether the monitored behavior is being performed by the process on behalf of a script. The agent may obtain information, such as context information about the script and associated policy information. Based on the obtained policy information, the agent including the hook may decide to report the behavior (for example, send a message indicating whether the behavior should be allowed, prohibited, or monitored further) and/or the agent including the hook may decide to apply a remedial action to the process.

Although the previous example describes the remedy as a killing of the process, other remedies may be used as well. For example, the agent may modify the attempted behavior, allow execution, and/or allow execution with limited access to resources of the host.

In some example embodiments, the sub-execution environment may be implemented as an execution environment but the script targeted for loading has not been loaded, called, and/or run. When this is the case, the agent may insert at least one of the hooks into the sub-execution environment before the targeted script is loaded, run, and/or selected or called for loading. Moreover, the agent may control execution by preventing the script from being loaded, selected/called, and/or run/executed.

Figure 4:
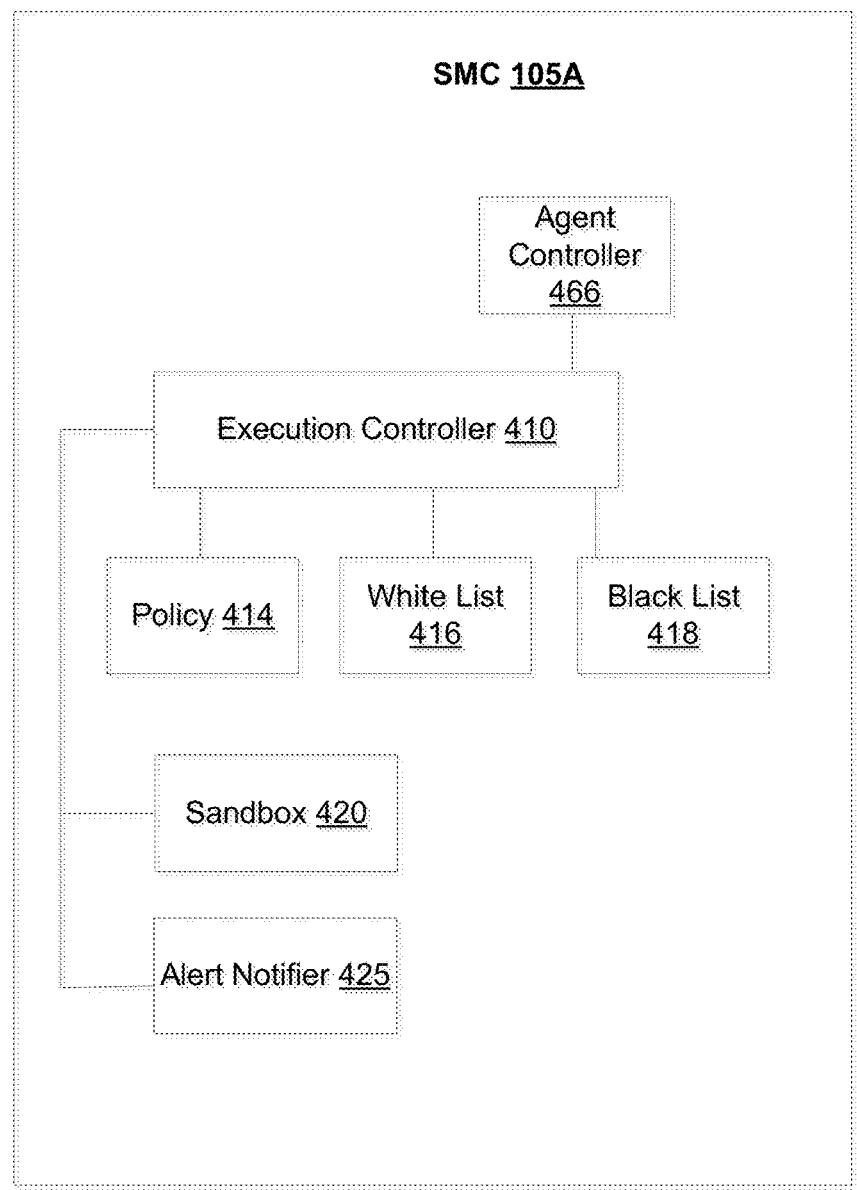
FIG. 4 depicts an example of a script monitor and controller, in accordance with some example embodiments.

FIG. 4 depicts an example implementation of an SMC, such as SMC 105A, in accordance with some embodiments.

The SMC 105A may include an agent controller 466 for inserting an agent into an execution environment of an object, such as an application, a script, and/or the like. The SMC 105A may also include an execution controller 410. The execution controller 410 may control the behavior of the document 190 and/or script 197 based on hooks 290A-E. The execution controller 410 may also access policy 414 (e.g., policy regarding behaviors allowed by one or more scripts) a white list 416 (for example, a list of script types, or their hashes, and their allowed behaviors), and/or a black list (e.g., a list of script types, or their hashes, and their prohibited behaviors). The execution controller 410 may also provide a sandbox 420 or other type of limited execution environment for a script or a document that may pose a risk of having a malicious script. The execution controller 410 may also access alert notifier 425 to generate messages regarding whether a file or document 190 including script 197 should be allowed to perform certain operations or behaviors such as delete files and/or the like.

The agent and hooks disclosed herein may control the behavior of a script executing in a secondary or sub-execution environment by intercepting certain behaviors rather than relying on a signature of the script.

One or more aspects or features of the subject natter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store in a transient manner (e.g., a processor cache or other random access memory associated with one or more physical processor cores).

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter.

Although a few implementations have been described in detail above, other modifications or additions are possible. In particular, further features and/or implementations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claim.

What is claimed is:

1. A method, implemented by at least one computing device, comprising:
    inserting, by an agent, one or more hooks into a sub-execution runtime environment, the sub-execution runtime environment configured to include a script and/or targeted to include the script;
    monitoring, by the agent including the one or more hooks, a behavior of the sub-execution runtime environment and/or the script;
    obtaining, by the agent including the one or more hooks, context information regarding the sub-execution runtime environment and/or the script; and
    controlling, by the agent, a runtime of at least the sub-execution runtime environment including the script, the controlling based on the monitored behavior of the sub-execution runtime environment and/or the script and the obtained context information regarding the sub-execution runtime environment and/or the script;
    wherein:
        a first hook of the one or more hooks is installed so as to monitor an operating system functionality to detect what type of object is being imported and/or from where an object is being imported into the sub-execution runtime environment;
        a second hook of the one or more hooks is installed so as to obtain context information relating to script execution; and
        a third hook of the one or more hooks is installed into an operating system module and/or a script execution environment-related module as the operating system module and/or the script execution environment-related module are loaded into the sub-execution runtime environment.

2. The method of claim 1, wherein the one or more hooks are inserted into a runtime environment for a document, and wherein the script is embedded in the document.

3. The method of claim 2, wherein the agent inserts a plurality of hooks comprising code hooks into the sub-execution runtime environment for the script and the runtime environment for the document.

4. The method of claim 1, wherein at least one hook of the one or more hooks is placed in a dynamic link library to monitor calls made by the sub-execution runtime environment including the script.

5. The method of claim 1, wherein the context information comprises a file name, a file path, and/or a uniform resource locator.

6. The method of claim 1, wherein at least one hook of the one or more hooks stores the context information using a global variable to enable sharing the context information with the agent or another hook.

7. The method of claim 1, wherein the controlling comprises:
    obtaining, by the agent, policy information; and
    determining, based on the monitored behavior of the sub-execution runtime environment and/or the script, the obtained context information regarding the sub-execution runtime environment and/or the script, the obtained policy information, and a remedial action to control the runtime of the at least the sub-execution runtime environment including the script.

8. The method of claim 7, wherein the remedial action comprises inhibiting execution of the script.

9. The method of claim 7, wherein the remedial action comprises allowing the script to execute with limited resources.

10. The method of claim 1, further comprising:
    inducing an error in execution of the script by at least modifying at least one argument of an intercepted function call.

11. The method of claim 1, further comprising:
    identifying and/or locating an interpreter of the sub-execution runtime environment; and hooking the interpreter of the sub-execution runtime environment.

12. The method of claim 1, further comprising:
monitoring a behavior of a process;
determining, based on at least one hook and the context information, whether the monitored behavior of the process is being performed by the process on behalf of a script;
obtaining information about the script; and
reporting the monitored behavior of the process and/or applying a remedial action to the process.

13. The method of claim 1, wherein the agent inserts at least one hook of the one or more hooks into the sub-execution runtime environment including the script before the script is loaded, run, and/or selected for loading.

14. The method of claim 1, wherein the agent inserts at least one hook of the one or more hooks into the sub-execution runtime environment including the script before the script is allowed to run and/or the script is called.

15. The method of claim 1, wherein the controlling, by the agent, includes preventing the script from being loaded, called, and/or executed.

16. A system comprising:
at least one processor; and
at least one memory storing program code which when executed causes operations comprising:
inserting, by an agent, one or more hooks into a sub-execution runtime environment, the sub-execution runtime environment configured to include a script and/or targeted to include the script;
monitoring, by the agent including the one or more hooks, a behavior of the sub-execution runtime environment and/or the script;
obtaining, by the agent including the one or more hooks, context information regarding the sub-execution runtime environment and/or the script; and
controlling, by the agent, a runtime of at least the sub-execution runtime environment including the script, the controlling based on the monitored behavior of the sub-execution runtime environment and/or the script and the obtained context information regarding the sub-execution runtime environment and/or the script;
wherein:
a first hook of the one or more hooks is installed so as to monitor an operating system functionality to detect what type of object is being imported and/or from where an object is being imported into the sub-execution runtime environment;
a second hook of the one or more hooks is installed so as to obtain context information relating to script execution; and
a third hook of the one or more hooks is installed into an operating system module and/or a script execution environment-related module as the operating system module and/or the script execution environment-related module are loaded into the sub-execution runtime environment.

17. The system of claim 16, wherein the one or more hooks are inserted into a runtime environment for a document, and wherein the script is embedded in the document.

18. The system of claim 17, wherein the agent inserts a plurality of hooks comprising code hooks into the sub-execution runtime environment for the script and the runtime environment for the document.

19. The system of claim 16, wherein at least one hook of the one or more hooks is placed in a dynamic link library to monitor calls made by the sub-execution runtime environment including the script.

20. The system of claim 16, wherein the context information comprises a file name, a file path, and/or a uniform resource locator.

21. The system of claim 16, wherein at least one hook of the one or more hooks stores the context information using a global variable to enable sharing the context information with the agent or another hook.

22. The system of claim 16, wherein the controlling comprises:
obtaining, by the agent, policy information; and
determining, based on the monitored behavior of the sub-execution runtime environment and/or the script, the obtained context information regarding the sub-execution runtime environment and/or the script, the obtained policy information, and a remedial action to control the runtime of the at least the sub-execution runtime environment including the script.

23. The system of claim 22, wherein the remedial action comprises inhibiting execution of the script.

24. The system of claim 22, wherein the remedial action comprises allowing the script to execute with limited resources.

25. The system of claim 16, further comprising:
inducing an error in execution of the script by at least modifying at least one argument of an intercepted function call.

26. The system of claim 16, further comprising:
identifying and/or locating an interpreter of the sub-execution runtime environment; and
hooking the interpreter of the sub-execution runtime environment.

27. The system of claim 16: further comprising:
monitoring a behavior of a process;
determining, based on at least one hook and the context information, whether the monitored behavior of the process is being performed by the process on behalf of a script;
obtaining information about the script; and
reporting the monitored behavior of the process and/or applying a remedial action to the process.

28. The system of claim 16, wherein the agent inserts at least one hook of the one or more hooks into the sub-execution runtime environment including the script before the script is loaded, run, and/or selected for loading.

29. The system of claim 16, wherein the agent inserts at least one hook of the one or more hooks into the sub-execution runtime environment including the script before the script is allowed to run and/or the script is called.

30. The system of claim 16, wherein the controlling, by the agent, includes preventing the script from being loaded, called, and/or executed.

31. A non-transitory machine-readable medium storing program code which when executed causes operations comprising:
inserting, by an agent, one or more hooks into a sub-execution runtime environment, the sub-execution runtime environment configured to include a script and/or targeted to include the script;
monitoring, by the agent including the one or more hooks, a behavior of the sub-execution runtime environment and/or the script;

obtaining, by the agent including the one or more hooks, context information regarding the sub-execution runtime environment and/or the script; and controlling, by the agent, a runtime of at least the sub-execution runtime environment including the script, the controlling based on the monitored behavior of the sub-execution runtime environment and/or the script and the obtained context information regarding the sub-execution runtime environment and/or the script;

wherein:
- a first hook of the one or more hooks is installed so as to monitor an operating system functionality to detect what type of object is being imported and/or from where an object is being imported into the sub-execution runtime environment;
- a second hook of the one or more hooks is installed so as to obtain context information relating to script execution; and
- a third hook of the one or more hooks is installed into an operating system module and/or a script execution environment-related module as the operating system module and/or the script execution environment-related module are loaded into the sub-execution runtime environment.

* * * * *